(No Model.)
T. W. CONNER.
ANIMAL TRAP.
No. 386,299. Patented July 17, 1888.
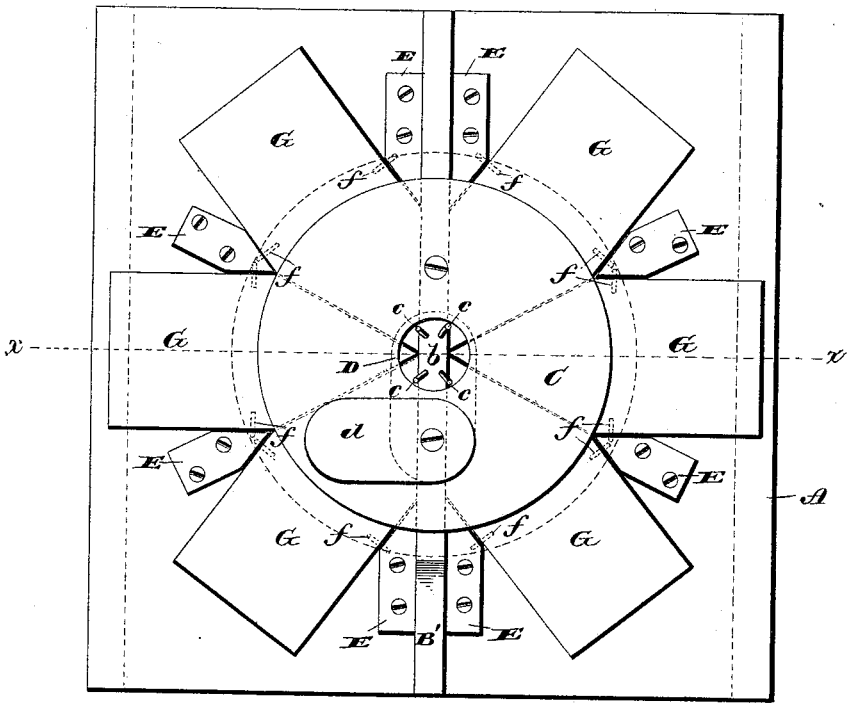
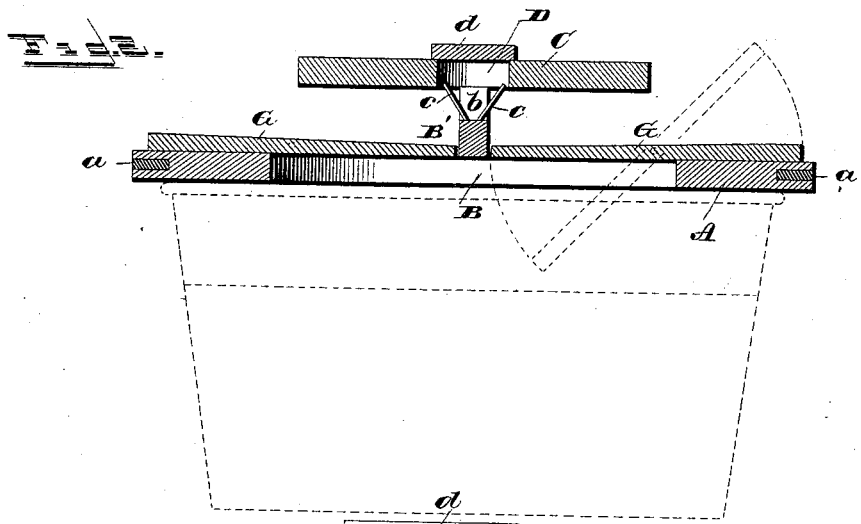
WITNESSES,
ThomasW.Conner.
INVENTOR,

UNITED STATES PATENT OFFICE.

THOMAS W. CONNER, OF ORANGEVILLE, PENNSYLVANIA.

ANIMAL-TRAP.

SPECIFICATION forming part of Letters Patent No. 386,299, dated July 17, 1888.

Application filed May 10, 1888. Serial No. 273,411. (No model.)

*To all whom it may concern:*

Be it known that I, THOMAS W. CONNER, a citizen of the United States of America, residing at Orangeville, in the county of Columbia and State of Pennsylvania, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in animal-traps of that class which are known as "self-set" and "ever-set," the object of the same being to provide an animal-trap having a protected bait-receptacle which is supported upon a transverse bar, on each side of which is located the pivoted platforms, the whole being mounted upon a support, so that it can be readily placed over a jar, bucket, or other receptacle, so that the same may be used as a trap for vermin.

The invention further consists in the special construction and combination of the parts, as will be hereinafter fully set forth, and specifically pointed out in the claim.

In the accompanying drawings, Figure 1 is a plan view. Fig. 2 is a sectional view taken through the line *x x* of Fig. 1. Fig. 3 is a side view, partly in section.

A refers to a board or platform provided at its edges with stiffening-pieces *a a* and a central opening, B. To the upper edge of the platform, so as to extend across the opening, is secured a strip, B', recessed centrally, as shown at *b*, to form a portion of the bait-receptacle. From the base of this recess *b* project upwardly-diverging pins *c c*, and this recess, with the central opening in the platform C, forms a bait-receptacle, D, within which the bait can be placed, after which it can be covered by a pivoted lid, *d*. The platform C is of less diameter than the opening in the board A, and is supported a considerable distance above the same, so that an animal in attempting to get at the bait will crawl under the platform C.

To the upper edge of the board or platform A are secured at suitable intervals blocks E E, the inner ends of which are tapered to correspond with the tapered ends of the pivoted platforms adjacent thereto. These tapered sides of the blocks E are provided with recesses at right angles therewith for the reception of pivoted pins *f f*, which extend from the sides of the pivoted frames G parallel thereto.

The inner ends of the pivoted platforms G are tapered and extend to a point under the bait-receptacle D.

The outer ends of the tilting platforms G contain a larger quantity of material than the inner or tapered ends, and will overbalance said tapered ends, so that the platforms will be held normally in a horizontal position; but as soon as they are counterbalanced by the weight of an animal they will be inclined, as shown in dotted lines, Fig. 2, so as to precipitate the animal within the receptacle, above which the trap is placed.

By providing a bait-receptacle, as hereinbefore described, and a platform above the same the animal will have to tread upon the platform in order to reach the bait, and excessive tilting of the frame is prevented by the outer ends of the platforms striking against the platform C.

The pivoted lid *d* forms a ready means for placing the bait in the bait-receptacle.

I am aware that prior to my invention it has been proposed to provide traps with pivoted platforms adapted to be counterbalanced by the weight of the animal, so as to deposit him in a receptacle; and I do not claim such construction broadly; but

What I claim as new is—

The combination, in an animal-trap, of a board or support, A, having a central opening, B, blocks E E, having ends beveled, said beveled ends projecting within the circumference of the opening B, platforms G, having their inner ends tapered and provided at their parallel sides with pivot-pins *f*, a cross-bar, B', having a central recess, the platform C, with a central opening, and a pivoted lid to provide a bait-receptacle, located centrally and above the pivoted platforms, substantially as shown, and for the purpose set forth.

In testimony whereof I affix my signature in presence of two witnesses.

THOMAS W. CONNER.

Witnesses:
H. J. CONNER,
A. B. STEWART.